United States Patent
Zietlow et al.

(10) Patent No.: US 6,207,216 B1
(45) Date of Patent: Mar. 27, 2001

(54) QUICKLY DISSOLVING AERATED CONFECTION AND METHOD OF PREPARATION

(75) Inventors: Philip K. Zietlow, Wayzata; Diran Ajao, St. Paul; Michael A. Helser, Minneapolis, all of MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 09/298,714

(22) Filed: Apr. 23, 1999

(51) Int. Cl.$^7$ .................................................. A23G 3/00
(52) U.S. Cl. .................... 426/564; 426/567; 426/571; 426/581; 426/591; 426/569
(58) Field of Search ..................... 426/619, 620, 426/571, 653, 564, 569, 660, 516, 593, 567, 581, 591

(56) References Cited

U.S. PATENT DOCUMENTS

| | | | |
|---|---|---|---|
| 3,012,893 | * 12/1961 | Kremzner | 426/591 |
| 3,206,315 | * 9/1965 | Anderson . | |
| 3,220,853 | * 11/1965 | Golosinec . | |
| 3,345,186 | * 10/1967 | Kanea . | |
| 3,556,812 | 1/1971 | Krohn et al. . | |
| 3,607,309 | * 9/1971 | Olney | 426/571 |
| 3,615,592 | * 10/1971 | Pekrson | 49/128 |
| 3,620,769 | * 11/1971 | Peterson | 99/134 |
| 3,682,659 | 8/1972 | Jurczak et al. . | |
| 3,684,528 | * 8/1972 | Batey . | |
| 3,700,461 | * 10/1972 | Dickens | 426/285 |
| 4,018,900 | * 4/1977 | Hayward | 426/571 |
| 4,049,832 | * 9/1977 | Hayward | 426/571 |
| 4,120,987 | * 10/1978 | Moore | 426/572 |
| 4,251,561 | * 2/1981 | Gajewski | 426/571 |
| 4,323,588 | * 4/1982 | Vink | 426/564 |
| 4,410,555 | * 10/1983 | Richardson | 426/572 |
| 4,415,595 | * 11/1983 | Takemori | 426/571 |
| 4,450,179 | * 5/1984 | Vink | 426/516 |
| 4,774,100 | 9/1988 | Markwardt et al. . | |
| 4,785,551 | * 11/1988 | Meyer | 34/10 |
| 4,818,554 | * 4/1989 | Giddey | 426/564 |
| 4,913,924 | 4/1990 | Moore . | |
| 4,925,380 | * 5/1990 | Meisner | 426/517 |
| 5,019,404 | * 5/1991 | Meisner | 426/517 |
| 5,030,460 | * 7/1991 | Baggerly | 426/548 |
| 5,254,355 | * 10/1993 | Smith | 426/285 |
| 5,342,635 | * 8/1994 | Schwab | 426/564 |
| 5,429,830 | * 7/1995 | Janoosky | 426/571 |
| 5,451,419 | * 9/1995 | Schwab | 426/564 |
| 5,532,017 | * 7/1996 | O'Donnell | 426/572 |
| 5,780,092 | * 7/1998 | Agbo | 426/569 |
| 5,789,002 | 8/1998 | Duggan et al. . | |
| 5,882,716 | * 3/1999 | Munz-Schaerer | 426/591 |
| 5,894,031 | * 4/1999 | Caly | 426/591 |
| 6,129,943 | * 10/2000 | Zeller | 426/588 |

OTHER PUBLICATIONS

Minifee 1980 Chocolate, Cocoa and Confectionary AVI Publishing Co., Inc. Westport CT p. 86.*
Van Der Schaaf Dec. 17, 1974 *The Mondomix Process for the Manufacture of Aerated Sugar Confectionery.*
Anon 1992 Commercial Brochure Bepex Corporation.

* cited by examiner

Primary Examiner—Carolyn Paden
(74) Attorney, Agent, or Firm—John A. O'Toole; Douglas J. Taylor; Everett G. Diederiks

(57) ABSTRACT

Aerated confections that dissolve quickly in water or in a dairy beverage are disclosed. The aerated food products preferably include 50 to 98% of a saccharide component; about 0.5 to 30% of a structuring agent; about 1 to 6% moisture; and about 1% to 5% of a whipping agent. The aerated food products have a density of about 0.1 to 1.0 g/cc. The compositions can be formed into pieces ranging from about 0.1 to 5 g each. Preparation methods for the pieces are also disclosed. The confectionery food products find particular suitability for use as ingredients for children's RTE cereals.

59 Claims, 1 Drawing Sheet sion System", each of which are incorporated herein by reference). Both the '404 and '380 well describe the difficulties and sensitivities of such foam product preparation.

QUICKLY DISSOLVING AERATED CONFECTION AND METHOD OF PREPARATION

FIELD OF THE INVENTION

The present invention is directed generally to food products and to their methods of preparation. In particular, the present invention is directed to improved aerated confectionery products such as dried marshmallows that dissolve quickly in cold water or milk and to processes for making such quick dissolving aerated, confectionery products.

BACKGROUND

Aerated confections products are popular food items. Some products are fabricated from aerated confection compositions that comprise a fat constituent while others are substantially free of such fat constituents. An illustrative fat free aerated confection is the common marshmallow. Such marshmallow products are familiar in both larger and smaller sizes.

It is well known that such marshmallows when fresh are soft and pliable but will stale by losing moisture and become hard. Indeed, purposefully pre-dried aerated confections are also well known. These products, particularly in smaller or bit sizes, are commonly added to certain popular Ready-To-Eat ("RTE") breakfast cereals, particularly those marketed to children. Due to their small size (i.e., having a number count of 4 to 6/g), these dried aerated confectionery marshmallow products are sometimes colloquially referred to as "Mar." bits or "marbits". The marbits must be pre-dried prior to admixture with the RTE cereal in order to reduce unwanted moisture migration from the marbit to the cereal and thus to forestall the multiple problems resulting therefrom. These dried marshmallow pieces exhibit desirable crisp, frangible eating qualities.

While there are many types of marshmallow products on the market, their methods of preparation generally fall into two main process groups: extruded marshmallow and deposited marshmallow. In both types, a sugar syrup and a structuring agent (such as agar or, preferably a gelatin) are the two main ingredients. Typically, the sugar syrup is heated to reduce moisture and is thereafter cooled down, and then combined with the gelatin solution to form a slurry. That slurry is then aerated to form a foam, and after aeration, colors and flavors are then added to the foam. The particular marshmallow product may be formed into its final shape by an extrusion process. That is, after aeration, the foam is extruded through a die to form a rope. The die imparts the desired peripheral shape to the extrudate rope. The rope is allowed to rest briefly to set, and then is cut into desired sizes. For dried marshmallows, the process can additionally include one or more drying steps. (See, for example U.S. Pat. No. 4,785,551 issued Nov. 2, 1988 to W. J. Meyer entitled "Method of Drying Confection Pieces").

While marshmallows of a single color are most common, marshmallows having two or even a plurality of colors (collectively herein, "multi-colored") are also known (see, for example, D 376,039 issued Dec. 3, 1996 entitled "Food Product" showing a two color marbit design) as well as methods for their preparation. (See, for example, U.S. Pat. No. 4,925,380 issued Oct. 20, 1986 entitled "Multicolor Confection Extrusion System and U.S. Pat. No. 5,019,404 issued Feb. 28, 1990 entitled "Multicolor Confection Extrusion System", each of which are incorporated herein by reference). Both the '404 and '380 well describe the difficulties and sensitivities of such foam product preparation.

The conventional processes for making multi-colored marshmallows teach to divide the aerated foam into a plurality of sub-streams, to admix a desired colorant to each sub-stream, and then extrude these colored sub-streams in substantially equal portions into a single rope or multiplicity of such ropes.

While multicolored marshmallow pieces have enhanced consumer appeal particularly for children's products, there is a continuing need for new confection products having novel appearance and appeal.

Generally, dried marshmallow pieces soften but do not dissolve upon exposure to cold milk and rapidly loose their desirable crisp and frangible eating qualities. Efforts have been thus been made at extending the bowl life of dried marshmallow pieces in cold milk, i.e., to lessen their propensity to soften in cold milk. Thus, previously, dried marshmallow piece that remained crisp in milk for times exceeding three minutes were considered to be desirable.

In contrast, however, the present invention provides dried marshmallows that dissolve quickly in cold water or milk and to methods of preparing such quick dissolving aerated confection pieces.

SUMMARY OF THE INVENTION

In its product aspect, the present invention resides in dried aerated confections that dissolve quickly in cold water or milk.

The aerated confections comprise:

About 50 to 95% of a saccharide component;

About 0.5 to 30% of a structuring agent; and,

About 1% to 5% of a whipping agent.

About 1 to 6% moisture;

The balance of the composition can be supplied by various conventional optional ingredients.

The confection compositions have densities of 0.10 to 1 g/cc.

The products are additionally characterized by a size count of 0.2 to 6/g and having moisture content of 1 to 8%. These products can have a body of one color or the body can comprise a plurality of disparately colored phases.

In its principal method aspect, the present invention provides methods for preparing a composite products comprising a first portion quickly dissolving aerated confections, and a second portion of a slowly dissolving aerated confection comprising the steps of:

A. providing a first stream of first aerated confection composition having one portion fabricated from a quickly dissolving aerated confection composition having:

a moisture content of about 8% to about 25%;

a density of about 0.1 to about 1.0 g/cc;

a temperature of about 70 to 180° F.; and,

B. providing a second stream of a second aerated confection composition fabricated from a slowly dissolving aerated confection composition having:

a moisture content of about 8% to about 25%;

a density of about 0.1 to about 1.0 g/cc;

a temperature of about 70 to 180° F.; and C. coextruding the first stream and second stream under pressure in an extruder without substantial intermingling of the extrusion steam to form a combined steam;

D. severing the combined steam into pieces;

E. drying the aerated confection pieces to a moisture content of about 1% to 6% to form dried aerated confections having a first quickly dissolving portion and that dissolve in second slowly dissolving portion.

DETAILED DESCRIPTION OF THE INVENTION

Figure 1:
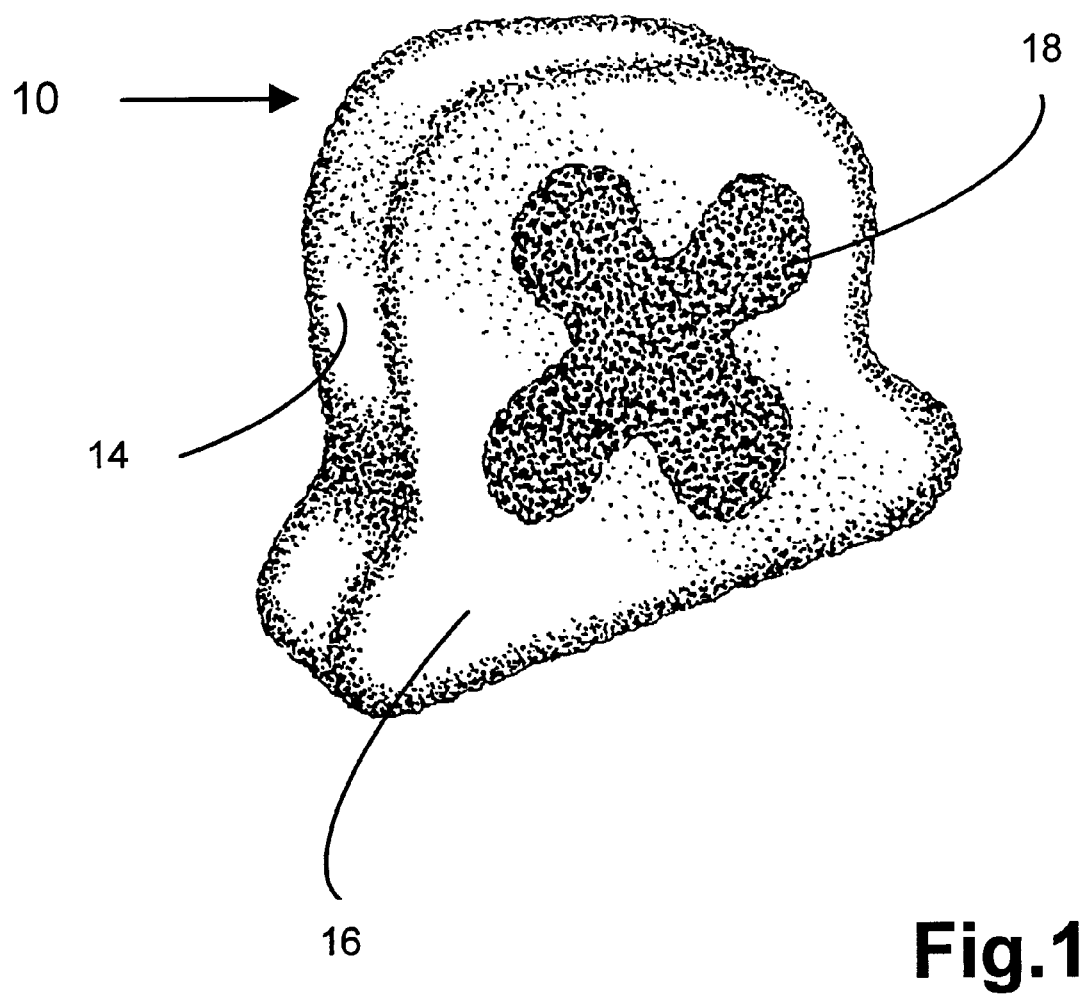
FIG. 1 is a perspective view of an aerated confection product of the present invention comprising a quick dissolving portion aerated and a slowly dissolving portion.

The present invention provides aerated confections products that dissolve quickly in cold water or milk and to methods for preparing aerated confections products. Each of the product ingredients and product features and steps of the present methods are described in detail below.

Throughout the specification and claims, percentages are by weight and temperatures in degrees Fahrenheit unless otherwise indicated.

The present invention provides novel aerated confectionery products that comprise a quickly dissolving but not "instantly" dissolving aerated confection. These confectionery products find particular suitability for use as added components to children's ready-to-eat breakfast cereals. Thus, by "quickly dissolving" herein is meant that a 0.2 g piece (whether spherical, cylindrical, or cube shaped) dissolves in liquid water or in a dairy beverage such as cold milk at a temperature above freezing up to 65° C. in about 10 to under 120 seconds. Better products dissolve in cold milk (5° C.) in about 20 to 90 seconds. If the confectionery product dissolves too quickly (i.e., in 5 to less than 10 seconds), then the product is "instantly dissolvable". If the confectionery product dissolves more slowly, (i.e., in about greater than 120 seconds), then the product is "slowly dissolvable". Slowly dissolvable products include conventional dried aerated marshmallow compositions that become soft upon extended exposure to cold milk (e.g., over 120 seconds) and dissolve thereafter only very slowly. Both instantly dissolvable and slowly dissolvable are unsuitable for use herein as the principal essential product component although each component can be used alone or together as an optional additional component or portion.

By "aerated confection product" is meant an aerated solid confectionery food product in solid form having a density in the range of from about 0.10 to about 1 g/cc and essentially comprising 1) saccharides, 2) a foam structuring agent, 3) a protein whipping agent, and 4) moisture.

The aerated confectionery composition products are fabricated from compositions that essentially comprise about 50 to about 95% of a saccharide component as the principle ingredient preferably about 65 to 95%. Most preferably, the saccharide component is used at about 70% to 90% of the confectionery compositions.

The saccharide component can include pure monosaccharide dextrose (e.g., anhydrous, monohydrate or dextrose syrup) and disaccharide sugars such as sucrose, and fructose, as well as hydrolyzed starch syrups such as corn syrup which include dextrin, maltose and dextrose, invert sugar syrups which include levulose and dextrose and/or converted fructose or glucose syrups. A portion of the saccharide component may be supplied by impure or flavored saccharidic ingredients such as fruit juices, purees, honey nectars, concentrated fruit juices, fruit flavors and mixtures thereof. The saccharide component can also include polysaccharides such as about 1 to 15% cornstarch. The cornstarch ingredient typically is added as part of a topical cornstarch addition to control stickiness. Some quantity of cornstarch is incorporated into the composition as a consequence of this usage of cornstarch. In preferred embodiments, the saccharde of choice is sucrose.

The confection essentially further includes about 0.5 to 30%, preferably about 1 to 6% and most preferably about 2.5 weight percent of a foam structuring or gelling component. Suitable structuring components include gelatin, hydrocolloid colloids such as pectin, modified starches, gums such as guar and mixtures thereof. For products to be marketed in North America, the preferred structuring agent is gelatin. The gelatin can be derived from bovine, porcine, or piscine (fish) sources or can be of mixtures thereof. Due to its cost and source purity, bovine gelatin is preferred in the United States.

The aerated confections further essentially comprise about 1% to 5% of a protein whipping agent. The whipping agent is essential to providing the quick dissolving feature herein. Suitable whipping agents can be supplied by soy protein hydrolyzates, egg albumen, sodium caseinate, malted milk, and mixtures thereof.

Preferred for use herein as the protein whipping agent are soy protein hydrolyzates. The soy protein hydrolyzates are well known and are for example, disclosed in U.S. Pat. No. 3,814,816 (issued Jun. 4, 1974 to R. C. Gunther, incorporated herein by reference). These proteins are commercially available from Quest International (Norwich, N.Y., U.S.A.), the successor-in-interest to Staley Manufacturing Co., Decatur, Ill., and are prepared by initially chemically hydrolyzing the soy protein to a prescribed viscosity range and, thereafter, enzymatically hydrolyzing the soy protein with pepsin to produce a pepsin modified hydrolyzed soy protein whipping agent. Like soy protein whipping agents commercially available from other suppliers. For example, especially useful herein is a soy protein available under the tradename Versa Whip 620K.

The present aerated confectionery compositions are preferably dried to form dried frangible compositions having a moisture content ranging from about 1 to 8%, preferably about 1 to 6% and most preferably about 2 to 5%.

The confections' compositions have densities of 0.10 to 1.0 g/cc, preferably about 0.1 to 0.4 g/cc and most preferably about 0.15 to 0.30 g/cc. Preferred products have a density of about 0.1 to 0.4 g/cc at moisture contents of 1 to 6%, preferably 2 to 5%.

The food product compositions can further comprise a wide variety of supplemental materials to improve the organoleptic, visual, or nutritional properties of the finished confectionery products. Useful materials include, for example, colors, flavors, high potency sweeteners, preservatives, nutritional fortifying ingredients and mixtures thereof. If present, such optional materials can collectively comprise from about 0.01% to about 25% by weight of the present products, preferably about 1% to 10%.

More preferably, any insoluble component such as mineral fortifying ingredient (e.g. calcium carbonate for calcium fortification) is added in the form of a fine powder having a particle size such that 90% has a particle size of less than 150 micron, preferably 100 μm or less in size.

In highly preferred embodiments, the present products comprise a calcium ingredient of defined particle size in an amount effective to provide the desired calcium enrichment. Good results are obtained when the present aerated confectionery compositions comprise sufficient amounts of calcium ingredients to provide the total calcium content of the composition to from about 50 to 2500 mg per 28.4 g (1 oz) serving (dry basis) (i.e., about 0.15% to 10% by weight, dry basis) of calcium, preferably about 100 to 1500 mg Ca per 28.4 g (1 oz.), and more preferably about 200 to 1500 mg Calcium/oz.

Useful herein to supply the desired calcium levels are calcium ingredients that supply at least 20% calcium. Preferred for use herein are calcium ingredients selected from the group consisting of food grade calcium carbonate, ground limestone, calcium phosphate salts and mixtures thereof.

In one preferred embodiment, the marshmallows are fat free, i.e., have fat contents of less than 5%, preferably less than 0.5% (dry weight basis). Low fat products are preferred for use herein since such products are more easily able to be formulated to form the present quickly dissolving products. In these embodiments, the fat level is provided by lipid content associated with one or more ingredients as compared to addition of a fat component. For example, when dry malted milk is used as a whipping agent, the high fat content of the malted milk (about 20%) can raise the total fat content. In other variations, e.g., chocolates, the aerated confection can comprise about 1% to 25% of an added fat component homogeneously blended with the other components preferably about 1 to 10% such as cocoa butter, dairy fat or dairy fat containing (e.g., cheese) or other edible fatty triglyceride or fat mimics such as sucrose polyesters.

The compositions can be optionally flavored and/or colored to provide uniform products or products having phases of variously colored and flavored potions. By "color" is meant a confection of any color, including white, which may be provided by the base confection ingredients, and by additional artificial or natural coloring agents. "Color" also includes various hues or shades, e.g., pink and red.

The present improved aerated confectionery compositions can be formed into suitably shaped and sized pieces. In preferred embodiments, the pieces have a size count ranging from about 0.2 to 6/g, preferably about 1 to 6/g, and most preferably about 4 to 6/g. Thus, pieces can range from about 0.15 to 5 g each. As a result, these pieces generally have a bulk density of about 235 to 340 g per liter. The pieces can be in common geometrical shapes such as disks, spheres, cylinders, cubes, or shaped such as to form three dimensional shapes. The pieces can also be in the form of wafers (e.g., having a thickness of about 1 to 30 mm preferably about 2 to 15 mm) that can have a peripheral outline of a regular shape, e.g., pentagon or animal or can be randomly shaped. In preferred form, wafers can have a cross sectional area ranging from about 15 mm$^2$ to about 900 mm$^2$. Due to their relative thinness, such wafer shaped pieces are sometimes referred to as two dimensional shapes.

In preferred embodiments, the pieces are in the form of composite pieces that additionally comprise a slowly dissolving aerated confection portion. The slowly dissolving portion is a portion that requires more than 90 seconds to dissolve in cold milk, preferably more slowly than two minutes. The slowly dissolving portion can be fabricated from known aerated confection compositions and techniques. Generally, such compositions are substantially free of any whipping proteins.

The slowly dissolving portion to quickly dissolving portion can range widely from about 1:20 to about 20:1. Each portion(s) can be continuous or discontinuous. For example, one portion can comprise both a core and also an outer shell with the second portion comprising an intermediate layer. In a preferred variation, the quickly dissolving portion comprises the outermost layer of portion. In more preferred embodiments, the quickly dissolving external portion completely surrounds the slowly dissolving portion to form a shell. In a preferred form, the shell is in the form of an egg. Disposed within the egg or eggshell is the more slowly dissolving portion. This slowly dissolving portion can be formed into the shape of a small baby animal such as a duckling, chick, reptile, and dinosaur. Upon addition to cold milk, the egg portion quickly dissolves to reveal the contained shaped baby portion.

As discussed above, in another variation, the pieces can be fabricated in the form of shaped wafers, e.g., having an outline in the form of a familiar object. Referring now to the drawing, FIG. 1 depicts an aerated confection piece of the present invention generally designated by reference numeral 10. Piece 10 is in the general shape of a wafer having opposed major surfaces and includes a shaped periphery 14 such as the hat shaped outline depicted. The shape is well known and described in U.S. design 376,039 (issued Dec. 3, 1996). Piece 10 includes an outer or peripheral layer 16 that can be fabricated from a slowly dissolving aerated confection composition. However, in contrast to current products fabricated from exclusively slowly dissolving dried aerated confections and used in certain RTE cereals, piece 10 of the present invention is further seen to have a shaped second portion 18 as a core surrounded by peripheral layer 16 that can be fabricated from a quickly dissolving composition of the present invention. Upon addition to milk, the quickly dissolving portion "melts" away to reveal a shamrock shaped aperture. In products of the prior art, the shamrock shaped portion is to the composition of the periphery portion 16 merely of a different color but otherwise compositionally identical. In other variations, the portions 16 and 18 can be reversed so that a hat shaped wafer dissolves quickly away to form a residual shamrock shaped wafer piece. In still other variations (not shown) either portion can be discontinuous. For example, a clown shaped piece with a red eye and a blue eye and a yellow mouth can be formed each from a quickly dissolving portion that can dissolve at the same or different but fast rates.

Method of preparation

The present invention further provides methods for preparing composite products comprising a first portion having at least one colored portion fabricated from a quickly dissolving aerated confection composition and a second portion comprising a slowly dissolving aerated confection composition.

The present methods essentially involve the combining without intermixing of a first stream, portion or supply of a quickly dissolving aerated confection with a second stream, portion or supply of a slowly dissolving aerated confection and co-extruding the two streams to form combined extrudate having at least two phases at least one of which is each slowly and quickly dissolving.

More specifically, the present methods comprise a first step of providing a first stream of first aerated confection composition having one portion fabricated from a quickly dissolving aerated confection composition in the form of a plastic mass having: a moisture content of about 8% to about 25%; a density of about 0.1 to about 1.0 g/cc; and a temperature of about 70 to 180° F.

The present methods further comprise a second step of providing a second stream of a second aerated confection composition fabricated from a slowly dissolving aerated confection composition having a moisture content of about 8% to about 25%; a density of about 0.1 to about 1.0 g/cc; a temperature of about 70 to 180° F.

The present methods further comprise a second step of co-extruding the first steam and second stream under pressure in an extruder without substantial intermingling of the extrusion steam to form a combined stream.

Thereafter, the present methods further comprise the steps of severing the combined stream into pieces; and drying the moist composite aerated confection pieces to a moisture content of about 1% to 8%, preferably about 1% to 6%, to form dried aerated confections having a first quickly dissolving portion and that dissolve in second slowly dissolving portion.

The moist pieces prior to drying will typically have moisture contents of about 8% to about 25%. The dried pieces have a density of about 0.1 to about 0.4 g/cc and in preferred embodiments each weigh about 0.1 to 7 grams. The dried pieces dissolve in water or in a dairy beverage having a temperature above freezing to about 65° C. in less than 120 seconds.

The composition ingredients can be combined and processed to form aerated warm, plastic confectionery foams using conventional equipment and techniques. The foams can be shaped into pieces such as by extruding the foam and allowing the foam to set, forming the set foam into pieces such as by severing starch covered set foam to form the moist pieces. In preferred embodiments, a quickly dissolving aerated confectionery composition is co-extruded with a slowly dissolving aerated confection composition to form composite pieces. Such techniques are especially useful to prepare "two dimensional" pieces such as wafers. Other piece shaping techniques can also be employed such as starch molding. These techniques are especially useful to prepare "three dimensional" pieces such as eggs.

The present methods further comprise an essential step of drying the aerated confection pieces to a moisture content of about 1% to 6% to form dried aerated confections that dissolve in cold skim milk in less than 90 seconds. The finished dried pieces can weigh 0.1 to about 5 g.

The resulting tempered dried aerated confectionery pieces can then be consumed as confections.

The dried aerated confectionery pieces, particularly dried marshmallow pieces, find particular suitability for use as an appealing added component of food products to provide novelty or play value. For example, the pieces may be admixed with a Ready-To-Eat ("R-T-E") breakfast cereal, especially sugar coated R-T-E cereals, intended as children's breakfast cereals.

In a preferred embodiment, the finished RTE cereal can comprise about 60 to 99% of a conventional dried cereal (such as flakes, shreds, puffs formed from a cooked cereal grain or dough of oats, wheat, corn, barley, rice or mixtures) and about 1% to about 40% by weight of the present novel dried marshmallow pieces. In still other variations, the present confections can be admixed with instant oatmeal, dry cocoa beverage mix (especially smaller sized pieces), and dry mixes for other products, e.g., gelatin dessert. The confections can also be used in cereal bar products, toppings for desserts such as ice cream or yogurt, or on various baked goods.

In other variations, the confections provide appealing carriers for various ethical drugs, vitamins, minerals and the like. Due to the aerated and frangible texture, the confections are easy to chew and are quickly dissolving.

EXAMPLE 1

A quickly dissolving aerated food product of the present invention is prepared having a base fabricated from a composition having the following formulation:

| Ingredient | Weight % |
|---|---|
| Sucrose | 75.9 |
| Malted Milk | 1.6 |
| Soy protein hydrolyzate | 2.0 |
| Guar gum | 2.0 |
| Carragenan | 0.3 |
| Moisture | 18.2 |
| | 100.0% |

The above formulation is formed into an aerated foam having a density of about 0.27 g/cc. Shaped pieces are prepared from this composition having about four to six pieces per gram. The shape pieces are dried at 70<° F. to a final moisture content of about 5% to form quickly dissolving pieces.

What is claimed is:

1. An aerated food product comprising: pieces having a first quickly dissolving portion that dissolves in water or a dairy beverage through a cold temperature above freezing in about 10 to 120 seconds, said first quickly dissolving portion having:
   at least one color,
   a density of about 0.1 to 1 g/cc, and,
   a moisture content of about 1% to 25%,
   said pieces each weighing from about 0.1 to 5 g.

2. An aerated food product comprising: pieces having a first quickly dissolving portion that dissolves in water or a dairy beverage in about 10 to 120 seconds, said first quickly dissolving portion having:
   at least one color, a density of about 0.1 to 1 g/cc;
   a moisture content of about 1% to 25%;
   about 65% to 98% of a saccharide component;
   about 0.5 to 30% of a structuring agent;
   about 1% to 5% of a protein whipping agent; and
   said pieces each weighing from about 0.1 to 5 g.

3. The quickly dissolving aerated food product of claim 2 comprising about 1 to 8% moisture and wherein at least a portion of the saccharide component is sucrose.

4. The quickly dissolving aerated food product of claim 3 wherein at least a portion of the structuring agent is gelatin.

5. The quickly dissolving aerated food product of claim 4 wherein at least a portion of the gelatin is derived from fish.

6. The quickly dissolving aerated food product of claim 4 wherein the density ranges from about 0.15 to 0.3 g/cc.

7. The quickly dissolving aerated food product of claim 6 comprising:
   about 65 to 98% of a saccharide component;
   about 0.5 to 10% of a structuring agent; and,
   about 2 to 5% moisture; and,
   about 1% to 5% of a protein whipping agent.

8. The quickly dissolving aerated food product of claim 7 wherein the protein whipping agent is a soy protein hydrolyzate.

9. The food product of claim 8 wherein at least a portion of the whipping agent is a soy protein hydrolyzate and at least a portion of the structuring agent is gelatin.

10. The quickly dissolving aerated food product of claim 4 having a fat content of less than 5%.

11. The aerated food product of claim 1 in the form of shaped pieces at least a first portion of which comprises the quickly dissolving aerated food product.

12. The aerated food product of claim 11 having a piece count of about 2 to 6 per gram.

13. The food product of claim 11 additionally comprising a second portion of a slowly dissolving aerated confection.

14. The food product of claim 13 wherein the weight ratio of quickly dissolving aerated food product portion to second portion of a slowly dissolving aerated confection ranges from about 20:1 to about 1:20.

15. The food product of claim 14 wherein the slowly dissolving portion is substantially free of a soy protein hydrolyzate.

16. The food product of claim 15 wherein the slowly dissolving portion is fabricated from an aerated confection composition such that a 0.2 g piece requires at least two minutes to dissolve in cold milk.

17. The food product of claim 16 wherein the slowly dissolving portion is of a second color.

18. The food product of claim 14 in the form of a wafer.

19. The food product of claim 18 in the form of a wafer having a thickness of about 1 to 5 mm.

20. The food product of claim 18 wherein the quickly dissolving aerated food product portion is in the form of a peripheral border.

21. The food product of claim 18 wherein the slowly dissolving aerated food product portion is in the form of a peripheral border.

22. The food product of claim 18 wherein the quickly dissolving aerated food product portion is in the form of core.

23. The food product of claim 22 wherein the portions are of differing colors.

24. The food product of claim 23 admixed with a ready-to-eat breakfast cereal.

25. The food product of claim 13 wherein the quickly dissolving aerated food product portion is in the form of a topical coating.

26. The food product of claim 25 wherein the quickly dissolving aerated food product portion is in the form of a topical coating completely surrounding the second portion of the slowly dissolving aerated confection.

27. The food product of claim 26 wherein the coating is in the form of an egg.

28. The food product of claim 27 wherein the second portion of a slowly dissolving aerated confection is in the form of an animal.

29. The food product of claim 28 wherein the second portion of a slowly dissolving aerated confection is of a different color than the topical coating.

30. The food product of claim 25 wherein the second portion has at least two phases characterized by different colors, flavors or composition.

31. An aerated food product comprising: pieces having a first quickly dissolving portion that dissolves in whole milk having a temperature of 2 to 10° C. in about 20 to 90 seconds, said first quickly dissolving portion having:
   at least one color,
   a density of about 0.1 to 1 g/cc, and,
   a moisture content of about 1% to 25%,
   said pieces each weighing from about 0.1 to 5 g.

32. The food product of claim 1 having a moisture content of about 1% to 6%.

33. A method for preparing a composite aerated confectionery food product, comprising the steps of:
   A. providing a first stream of first aerated confection composition having one portion fabricated from a quickly dissolving aerated confection composition having:
   a moisture content of about 8% to about 25%;
   a density of about 0.1 to about 1.0 g/cc;
   a temperature of about 70 to 180° F.; and,
   B. providing a second stream of a second aerated confection composition fabricated from a slowly dissolving aerated confection composition having:
   a moisture content of about 8% to about 25%;
   a density of about 0.1 to about 1.0 g/cc;
   a temperature of about 70 to 180° F.; and
   C. co-extruding the first stream and second stream under pressure in an extruder without substantial intermingling of the extrusion stream to form a combined stream;
   D. severing the combined stream into pieces; and
   E. drying the aerated confection pieces to a moisture content of about 1% to 6% to form dried aerated confections having a first quickly dissolving portion and a second slowly dissolving portion.

34. The method of claim 33 wherein the first quickly dissolving composition comprises:
   about 65% to 98% of a saccharide component;
   about 0.5 to 30% of a structuring agent; and, about 1% to 5% of a protein whipping agent.

35. The method of claim 34 wherein the protein whipping agent is a soy protein hydrolyzate.

36. The method of claim 34 wherein the quickly dissolving composition has a fat content of less than 5%.

37. The method of claim 34 wherein the quickly dissolving composition has a fat content of less than 0.5%.

38. The product prepared by the method of claim 37.

39. The method of claim 34 wherein the weight ratio of first quickly dissolving aerated food product composition to second slowly dissolving aerated confection composition ranges from about 20:1 to about 1:20.

40. The method of claim 39 wherein the slowly dissolving composition is substantially free of a whipping protein.

41. The method of claim 39 wherein the slowly dissolving composition is fabricated from an aerated confection composition that a 0.2 g piece requires at least two minutes to dissolve in cold milk.

42. The method of claim 41 wherein at least a portion of the slowly dissolving composition is of a second color.

43. The method of claim 42 wherein the quickly dissolving aerated food product composition is in the form of a topical coating.

44. The method of claim 43 wherein the quickly dissolving aerated food product composition is in the form of a topical coating completely surrounding the second slowly dissolving aerated confection composition.

45. The method of claim 44 wherein the coating is in the form of an eggshell.

46. The method of claim 45 wherein the second slowly dissolving aerated confection composition is in the form of an animal disposed within the eggshell.

47. The method of claim 46 wherein the second slowly dissolving aerated confection composition is of a different color than the topical coating.

48. The product prepared by the method of claim 45.

49. The method of claim 41 wherein the second slowly dissolving aerated confection composition has at least two phases characterized by different colors, flavors or composition.

50. The method of claim 49 in the form of a wafer.

51. The product prepared by the method of claim 49.

52. The method of claim 41 in the form of a wafer having a thickness of about 1 to 5 mm.

53. The method of claim 52 wherein the quickly dissolving aerated food product composition is in the form of a peripheral border.

54. The method of claim 52 wherein the the slowly dissolving aerated food product composition is in the form of a peripheral border.

55. The method of claim 54 wherein the quickly dissolving aerated food product composition is in the form of core.

56. The method of claim 55 wherein the compositions are of differing colors.

57. The method of claim 56 additionally comprising the step of: admixing the pieces with a ready-to-eat breakfast cereal.

58. The product prepared by the method of claim 57.

59. The product prepared by the method of claim 34.

* * * * *